United States Patent [19]

Kusui

[11] 3,710,254
[45] Jan. 9, 1973

[54] DIODE WATTHOURMETER

[75] Inventor: Shoji Kusui, Soka, Japan

[73] Assignee: Nihon Denki Keiki Kenteisho, Tokyo-to, Japan

[22] Filed: Feb. 1, 1971

[21] Appl. No.: 111,448

[30] Foreign Application Priority Data

Feb. 9, 1970 Japan .................................. 45/10651

[52] U.S. Cl. ................................................. 324/142
[51] Int. Cl. ............................................. G01r 21/00
[58] Field of Search ............... 324/132, 142; 328/144

[56] References Cited

UNITED STATES PATENTS

| | | | |
|---|---|---|---|
| 2,879,477 | 3/1959 | Miller et al. | 324/142 |
| 2,919,408 | 12/1959 | Brown | 324/142 |
| 2,810,107 | 10/1957 | Sauber | 324/132 UX |

Primary Examiner—Alfred E. Smith
Attorney—Holman & Stern

[57] ABSTRACT

A diode watthourmeter in which square-law rectifying circuits are provided wherein a plurality of diodes are connected in series and resistors properly branched at points connecting said diodes are provided, the forward voltages of the diodes successively added being used for the power detection of a sum and difference square-law system, and further difference output current of the power detecting circuit being converted into a pulse to be counted.

2 Claims, 6 Drawing Figures

DIODE WATTHOURMETER

BACKGROUND OF THE INVENTION

The present invention relates to an electronic static type electrical energy measuring watthourmeter which serves to count an output pulse signal proportional to the electrical energy being measured.

Most of the conventional watthourmeters are induction type watthourmeters and employ a method wherein the number of rotations of a disc rotated by electro-magnetic induction is counted. Therefore, the conventional watthourmeter involves such disadvantages as the wear of rotating portions thereof, thereby resulting in deterioration of the whole watthourmeter; consequently, any possibility of improvement in its characteristic is theoretically limited.

SUMMARY OF THE INVENTION

It is accordingly a primary object of the present invention to provide a novel arrangement of a diode watthourmeter wherein all of the above-described drawbacks of the conventional devices can be eliminated.

Another object of the present invention is to provide an electronic watthourmeter which is very simple in a circuit organization, is high in accuracy and superior in performance, but using ordinary components.

A further object of the present invention is to provide a static type watthourmeter wherein a signal pulse having a frequency proportional to an electric power is generated by a simple circuit comprising diodes, and transistors and electrical energy to be measured is indicated by the count of the number of the pulses.

A still further object of the present invention is to provide a diode watthourmeter comprising a square-law rectifying circuit having an uniform characteristic which is readily obtained by converting a diode square-law rectifying circuit and the like into integrated circuits.

The nature, utility and the principle of the present invention will be more clearly understood from the following detailed description with reference to the accompanying drawings.

DETAILED DESCRIPTION OF THE INVENTION

Figure 1:
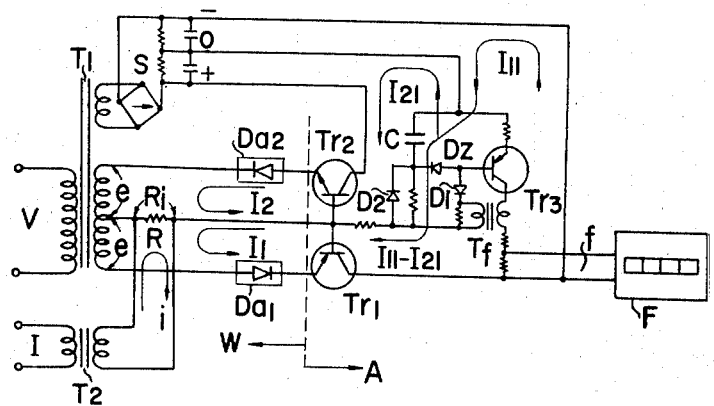
FIG. 1 is an electrical circuit diagram showing an example of the diode watthourmeter according to the present invention.

With reference now to FIG. 1, the left side (W) of a dotted-line represents a diode type power detecting circuit, while the right side (A) of the dotted line represents a difference current - pulse conversion circuit.

In a power detection method according to the present invention, the theory of a so-called sum and difference square-law system is employed, and diodes are used for a square-law rectifying circuit thereof.

Known as the square-law rectifying circuit method using a diode is a method wherein the voltage vs. current characteristic of the diode itself is of an exponential function and a narrow range of a minute voltage is utilized by being regarded as a square-law characteristic in approximate value; a second method known is termed the polygonal line function method wherein a plurality of diodes and resistors and a d.c. electric source are used. The former method involves such disadvantages: a desired accuracy is obtained only in an extremely small range, an output thereof is small, and a square-law circuit with high accuracy cannot be obtained in practical use. On the other hand, although in the latter method a relatively large output can be obtained, an error due to the polygonal line approximation is involved. Moreover, the latter method necessitates a d.c. electrical source obtained for instance from a constant-voltage (zener) diode means and the like, and therefore a square-law circuit with high accuracy cannot be obtained despite an elaborate circuit.

Figure 2:
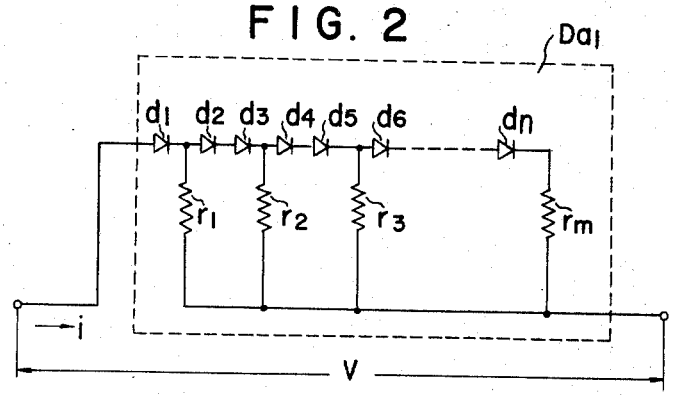
FIG. 2 is an electrical circuit diagram illustrating a half-wave rectification type diode circuit included in FIG. 1.
Figure 3:
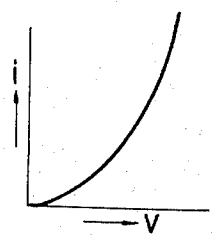
FIG. 3 exhibits a voltage vs. current characteristic curve of the circuit shown in FIG. 2.

Now in the present invention, a method wherein forward voltage drops of diodes are successively added is employed. The method utilizes a fact that since diodes $d_1$, $d_2$ through $d_n$ are combined with resistors $r_1$, $r_2$ through $r_m$ as shown in FIG. 2, a current flows through the diodes $d_1$, $d_2$ through $d_n$ in the described order in response to the increment of an applied voltage, and as result these forward voltage drops are successively added thereby to obtain a voltage vs. current characteristic as shown in FIG. 3, namely, a square-law characteristic. In this case, a square-law rectification characteristic with high accuracy can be obtained by adjusting the values of the resistors $r_1$, $r_2$ through $r_m$, and as a result a complete square-law rectification operation is carried out.

Reference symbols $Da_1$ and $Da_2$ in FIG. 1 represent diode circuits having the square-law rectification characteristics as described above. A voltage $(e + Ri)$ is applied to the diode circuit $Da_1$ side whereby a current $I_1 \propto (e + Ri)^2$ flows therethrough, while a voltage $(e - Ri)$ is applied to the diode circuit $Da_2$ whereby a current $I_2 \propto (e - Ri)^2$ flows therethrough. In FIG. 1, reference symbol $e$ is a secondary voltage of a transformer $T_1$, $i$ is a secondary current of a transformer $T_2$, R is a load resistance of the transformer $T_2$, V is an input voltage and I is an input current. The currents $I_1$ and $I_2$ are converted into currents $I_{11}$ and $I_{21}$ by transistors $Tr_1$ and $Tr_2$ respectively, and the difference current $(I_{11} - I_{21})$ is supplied to a capacitor C. The currents $I_{11}$ and $I_{21}$ are proportional to the currents $I_1$ and $I_2$ respectively, and therefore the difference current $(I_{11} - I_{21})$ will be as follows:

$$(I_{11} - I_{21}) \propto (I_1 - I_2) \propto 4Rei$$

In other words, the difference current is proportioned to a power $ei$. When a charge voltage of the capacitor C becomes higher than a voltage between the base and the emitter of a transistor $Tr_3$ thereby to start making the transistor $Tr_3$ conductive, the capacitor C is abruptly charged in the reverse by a feed-back current $i_f$ furnished from a feed-back transformer $T_f$, whereby the transistor $Tr_3$ becomes non-conductive at the same time as a pulse current flows to the collector side. Furthermore, the same operation as above-mentioned is repeated, the capacitor being discharged (charged) by the difference current ($I_{11} - I_{21}$). In this case, a peak value of a feed-back voltage $Vf$ is made constant by a constant-voltage diode $D_z$, and as a result a reverse charge voltage for the capacitor is constant at all times and a discharge rate of this capacitor is proportional to the difference current ($I_{11} - I_{21}$). Consequently, a charge and discharge repeating frequency — that is, the pulse frequency ($f$) of a current pulse generated on the collector side of the transistor $Tr_3$, will be as follows:

$$f \infty \ (I_{11} - I_{21}) \infty \ 4 \, Rei$$

In other words, the pulse frequency is proportional to a power ($ie$). By counting this repetitive pulse by a counter F the electrical energy to be measured can be computed.

A diode $D_1$ is used for protection against an excessive voltage application, while a diode $D_2$ serves to improve the characteristic. Reference symbol S represents a rectifier for a d.c. electric source of transistors $Tr_1$, $Tr_2$ and $Tr_3$. Moreover, in each of transistors $Tr_1$ and $Tr_2$ shown in FIG. 1, the combination of its base and emitter is used as a diode, and the transistors are made high in resistance with the aid of collectors, thereby being utilized as a current source for the capacitor C. In this case, an operational amplifier is not always required and the arrangement is simply completed by In the diode watthourmeter according to the present invention as described above, the diode circuits $Da_1$ and $Da_2$ operate during a respective half cycle. Therefore, when even harmonics are included, an undesirable error is likely to be caused.

Figure 4:
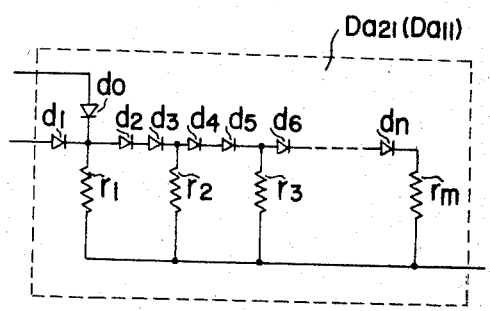
FIG. 4 is an electrical circuit diagram indicating a full-wave rectification type diode circuit.
Figure 5:
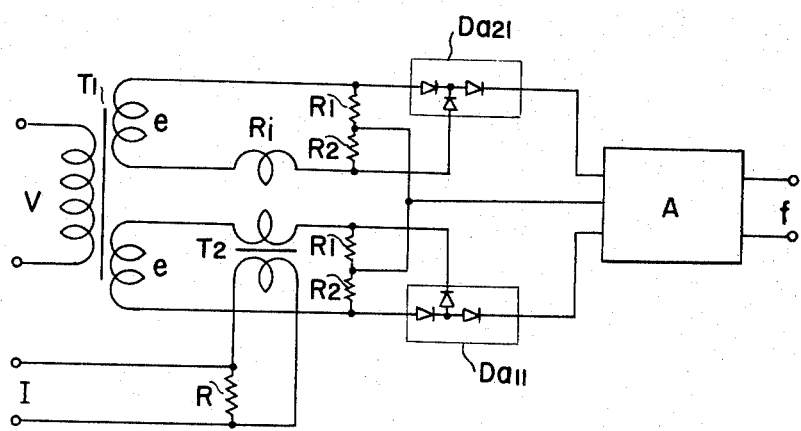
FIGS. 5 and 6 are electrical circuit diagrams respectively illustrating other examples according to the present invention.
Figure 6:
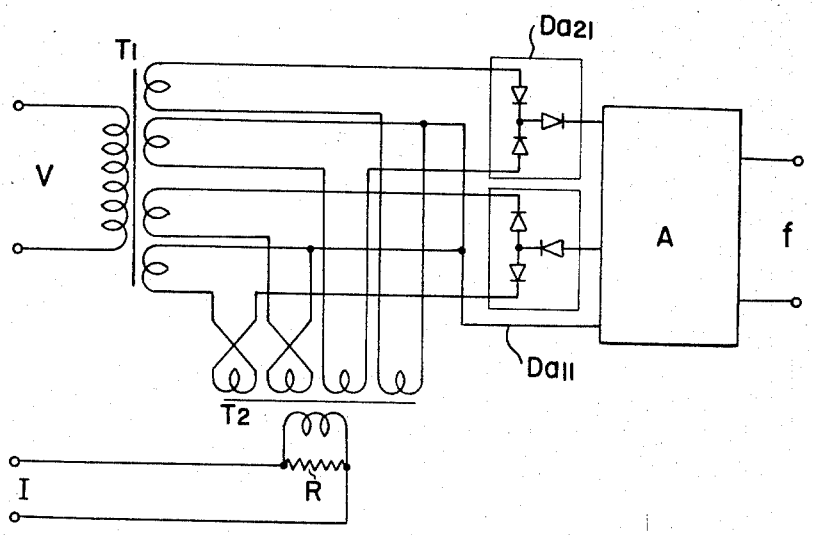

In order to overcome this disadvantage, watthourmeters each of which employs a full-wave rectification type diode circuit may be utilized and these are shown in FIGS. 5 and 6. A diode circuit $Da_{11}$ comprises the diode circuit $Da_1$ additionally provided with a diode $d_0$, while a diode circuit $Da_{21}$ comprises the diode circuit $Da_2$ additionally provided with the diode $d_0$, as shown in FIG. 4. First, the diodes $d_0$ and $d_1$ in combination carry out full-wave rectification, and a current obtained by the full-wave rectification flows through the diodes $d_2$, $d_3$ through $d_n$. In FIG. 5, a voltage is divided into voltages ($e + Ri$) and ($e - Ri$) by means of resistors $R_1$ and $R_2$. In FIG. 6, a method wherein a voltage is divided by means of transformers $T_1$ and $T_2$ is employed. Reference symbol A represents the previously mentioned difference current — pulse conversion circuit, the circuit of which may be composed by utilizing the charge and discharge of the capacitor C or a magnetic charge and discharge system.

While a few embodiments of the present invention have been illustrated and described in detail, it is particularly understood that the present invention is not limited thereto or thereby.

I claim:

1. A diode watthourmeter for measuring a.c. electrical energy consumed by a load, using square-law rectifying circuits, comprising:
    first and second square law rectifying circuit means, each of said first and second square law rectifying means, including
        an input point and an output point,
        a plurality of diodes series connected with said input point and having intermediate connection points, a plurality of resistor means each having first and second terminals said first terminals of said plurality of resistor means being connected to a corresponding one of said intermediate connection points, said second terminals being connected together to said output point,
    first and second transistors having their emitters connected to a respective group of said plurality of series connected diodes of said first and second square law rectifying circuit means;
    a.c. circuit means connected to the input point of said first square law rectifying means to apply thereto a voltage which is the sum of a first voltage equal to the a.c. voltage of the load and a second voltage which is proportioned to the current in the load; said a.c. circuit means also being connected to the input point of said second square law rectifying means to apply thereto a voltage which is the difference of said first and second voltages;
    a capacitor circuit means including a path for flow of a difference current between output points of said first and second square law rectifying means, and comprising a capacitor connected to receive current pulses from collectors of said first and second transistors in said path for flow of said difference current;
    and means to measure a frequency of said current pulses, whereby said first and second transistors operate as diodes, and, by virtue of the inherent high collector-base impedance of said first and second transistors of the first and second square law rectifying circuit means, an ideal square law relation is obtained resulting in improved accuracy of electrical energy measurement.

2. A diode watthourmeter as claimed in claim 1, further comprising: a linearity compensation diode and a parallel resistor, the two connected in series with said capacitor in said path for flow of said difference current; a feed-back transformer having primary and secondary windings; a switching transistor having its collector connected to the primary winding of said feedback transformer; a constant voltage diode connected between said capacitor and the base of said switching transistor; means connecting one end of said secondary winding to the base of said switching transistor, and connecting the other end of said secondary winding to said linearity compensation diode and said parallel resistor, whereby a secondary pulse current of the feed-back transformer is supplied to said capacitor.

* * * * *